United States Patent [19]

Hoppe et al.

[11] Patent Number: 4,833,199

[45] Date of Patent: May 23, 1989

[54] PROCESS FOR THE PREPARATION OF WATER-SOLUBLE COPOLYMERS

[75] Inventors: Lutz Hoppe; Helmut Huhn, both of Walsrode; Werner Karstens, Bomlitz; Eugen Reinhardt, Walsrode, all of Fed. Rep. of Germany

[73] Assignee: Wolff Walsrode AG, Walsrode, Fed. Rep. of Germany

[21] Appl. No.: 220,347

[22] Filed: Jul. 12, 1988

Related U.S. Application Data

[63] Continuation of Ser. No. 53,234, May 22, 1987, abandoned.

[30] Foreign Application Priority Data

Jun. 12, 1986 [DE] Fed. Rep. of Germany ....... 3619721

[51] Int. Cl.$^4$ .............................................. C08L 9/04
[52] U.S. Cl. ............................... 524/828; 525/329.1; 525/329.2; 525/387
[58] Field of Search .................... 524/828; 525/329.1, 525/329.2, 387

[56] References Cited

U.S. PATENT DOCUMENTS

| | | | |
|---|---|---|---|
| 2,812,317 | 11/1957 | Barrett | 524/566 |
| 3,060,142 | 10/1962 | Isabella | 524/828 |
| 4,107,121 | 8/1978 | Stoy | 524/566 |
| 4,272,422 | 6/1981 | Tanaka | 524/566 |

Primary Examiner—Joseph L. Schofer
Assistant Examiner—J. M. Reddick
Attorney, Agent, or Firm—Sprung Horn Kramer & Woods

[57] ABSTRACT

Process for the preparation of aqueous solutions of hydrolysed styrene/acrylonitrile copolymers, the carboxyl groups of which are entirely or partly present as NH$_4$ and/or alkali metal salt, characterized in that (a) 40–90% by weight of acrylonitrile,
(b) 10–60% by weight of styrene and
0–20% by weight of further monomer which can be hydrolysed by alkali are subjected to suspension or emulsion polymerization, the aqueous dispersion or emulsion is subsequently hydrolysed at 90°–220° C. in the presence of alkali metals and/or alkaline earth metals, and, if appropriate, the copolymer solution is treated with hydrogen peroxide wherein a part of the styrene may be replaced by a further monomer which cannot be hydrolysed by alkali.

10 Claims, No Drawings

PROCESS FOR THE PREPARATION OF WATER-SOLUBLE COPOLYMERS

This application is a continuation of applicaton Ser. No. 053,234, filed 5/22/87 now abandoned.

The present invention relates to the preparation of water-soluble copolymers by polymerizing styrene and acrylonitrile, hydrolysing by means of alkali, and, if appropriate, treating with $H_2O_2$, and the use of the aqueous solutions of these copolymers as sizing agents for fibres.

It is already known that aqueous solutions of acrylic acid copolymers can be employed as sizing agents for natural and synthetic fibres.

The warp threads of almost all yarns must be provided with sizing agent before weaving, and the fibres are then glued together to form a compact fibre assemblage, and the thread is smoothed, so that they withstand the weaving process. In this case, however, the sized threads must allow the weaving preparations to be carried out easily and, for example, not stick to one another on storage, and, finally, after the sized threads are woven, it must be possible to remove the sizing agents from the fabric by washing so that they do not cause any problems in the subsequent finishing processes, for example during dyeing or impregnation. The copolymers used may be prepared by emulsion, suspension or solution polymerization (DOS (German Published Specification) Nos. 2,308,151, 2,852,832, 2,812,038, 2,714,897 and German Patent Specification No. 2,009,433). Here, however, polymers are obtained which always still contain a certain proportion of unreacted monomers. This remainder of unsaturated compounds must be removed from the polymer by complicated processes and worked up again since it otherwise represents a considerable environmental pollution.

Surprisingly, success has been attained, using the process according to the invention, in providing an aqueous solution of copolymers which is not only free of residual monomers, and can thus be employed as sizing agent directly after preparation, without further workup, but it also obtained by polymerization of only a few easily accessible and inexpensive monomers.

The present invention thus relates to processes for the preparation of aqueous solutions of hydrolysed styrene/acrylonitrile copolymers, the carboxyl groups of which are entirely or partly present as $NH_4$ and/or alkali metal salt, which are characterized in that
(a) 40-90% by weight, preferably 50-70% by weight, of acrylonitrile,
(b) 10-60% by weight, preferably 30-50% by weight, of styrene and
(c) 0-20% by weight, preferably 3 to 15% by weight, of at least one further monomer which can be hydrolysed by alkali,
are subjected to suspension or emulsion polymerization, the aqueous dispersion or emulsion is subsequently hydrolysed at 90°-220° C., preferably 120°-190° C., in the presence of alkali metals and/or alkaline earth metals, and, if appropriate, the copolymer solution is treated with hydrogen peroxide wherein a part of the styrene may be replaced by a further monomer which cannot be hydrolysed by alkali such as butadiene, isoprene and divinylbenzene.

The aqueous solution, thus obtained, of the hydrolysed copolymer, the viscosity of which is reduced, if appropriate, by the $H_2O_2$ treatment and which preferably comprises
(a) acrylamide—12-29% by weight,
(b) ammonium acrylate—3-70% by weight,
(c) sodium acrylate—0-70% by weight,
(d) acrylic acid—5-8% by weight, and
(e) styrene—5-55% by weight,
and in which the sum of a-e preferably produces 100% by weight, has no residual monomers and can thus be used as sizing agent without further work-up.

In a preferred embodiment, 0-20% by weight of further unsaturated monomers which can be hydrolysed by alkali, such as, for example, acrylates or methacrylates having up to 5 C atoms in the alcohol component, vinyl acetate and/or, for example, unsaturated carboxylic acids, such as maleic acid, methacrylic acid and itaconic acid, may be copolymerized in addition to styrene and acrylonitrile. In a further preferred embodiment, only acrylonitrile and styrene are copolymerized.

The polymerization of the monomer mixture can be carried out continuously or batchwise, the emulsion polymerization process as described in Ullmanns Encyklopädie der technischen Chemie [Ullmann's Encyclopaedia of Industrial Chemistry], 4th edition, Volume 19, page 132, preferably being used.

The intrinsic viscosity $[\eta]$, measured in DMF with 0.3% of $NaNO_3$, of the polymers should be between 0.3-4.5 dl/g, preferably 0.8-2.8 dl/g. A preferably 15-30% strength by weight aqueous dispersion of the polymer is hydrolysed in the same or a separate reactor at temperatures of 90°-220° C., preferably 120°-190° C., with alkali metal hydroxides and/or alkaline earth metal hydroxides, such as NaOH, KOH and/or $Mg(OH)_2$, with up to 80 mol %, preferably 40-70 mol %, of the hydrolysable monomers of the polymer.

The hydrolysis is preferably carried out as described in DOS (German Published Specification) No. 2,031,972.

If the viscosity of the hydrolysate solutions is too high, it is recommended that the solution be treated with 0.01-2% by weight, relative to the polymer, of hydrogen peroxide at 20°-100° C. The hydrolysate should preferably have a relative viscosity of 0.5 and 5.0, preferably of 1.0 and 3.0, measured on a solution of 1 g of hydrolysate in 100 ml of 2 molar aqueous $NaNO_3$ solution. Relative viscosity is taken to mean the quotient of Ubbelohde viscosity of the polymer solution and the Ubbelohde viscosity of the pure solvent.

The aqueous solutions should be used directly, per se or in mixtures with starch or carboxymethylcellulose, for example, as sizing agents for staple fibres (cotton, viscose staple fibre, synthetic fibres, and mixtures thereof) and filament yarns (polyamide and polyester fibres, viscose yarns), the solids content, relative to the total solution, preferably being 10 to 35% by weight, particularly 20 to 30% by weight.

EXAMPLE 1

1.1 Polymerization 40 kg of demineralized water
0.1 kg of 20% strength by weight aqueous Mersolat ® (alkanesulphonate)
1.100 kg of acrylonitrile
0.700 kg of styrene and
0.200 kg of methyl acrylate are mixed together in an autoclave equipped with stirrer, and, after the autoclave is sealed, are heated to 40° C. under nitrogen.

When this temperature is reached, 1.09 kg of a solution of 0.09 kg of 35% strength by weight $H_2O_2$ and 1 kg of demineralized water, and 1.03 kg of a solution of 0.03 kg of isoascorbic acid and 1 kg of demineralized water as redox initiator are added to the autoclave contents via a pressure device.

Within 300 minutes are added simultaneously and continuously:
1. A monomer mixture, comprising
   20.9 kg of acrylonitrile
   13.3 kg of styrene and
   3.8 kg of methyl acrylate,
2. an initiator solution, comprising
   0.3 kg of 35% strength by weight $H_2O_2$ and
   9.0 kg of demineralized water, and
3. an emulsion solution comprising
   7.0 kg of demineralized water
   1.9 kg of 20% strength by weight aqueous Mersolat ® solution (alkanesulphonate) and
   0.1 kg of isoascorbic acid.

When the sluiced addition is complete, the autoclave contents are stirred for a further 360 minutes at 40° C., and then cooled to room temperature.

A 39.5% strength by weight dispersion having an intrinsic viscosity (measured in DMF with 0.3% of $NaNO_3$) $[\eta]=1.57$ dl/g was obtained.

1.2 Hydrolysis

Of this 39.5% strength by weight dispersion, 60.57 kg are placed in a stainless steel autoclave, designed for a pressure of 30 bar and equipped with a stirrer, together with 6.074 kg of NaOH, which was dissolved in 80.35 kg of water, and, after the autoclave is sealed, heated to 185° C. under nitrogen. The reaction is complete after 5 hours at 185° C. The pressure-release valve is carefully opened, with simultaneous cooling, and the ammonia/steam mixture which escapes is disposed of using a scrubber. When depressurization in the autoclave is achieved, 50 g of an antifoaming agent, such as a dimethylpolysiloxane (Baysilon ® AC), are added as a 30% strength aqueous emulsion, and the autoclave contents are boiled, with the pressure-release valve open, until a pH of about 7 is reached.

No residual monomers can be detected by gas chromatography.

1.3 Hydrogen peroxide-treatment

When the pH in the hydrolysate has reached about 7, the batch is cooled to 50° C., 6.457 kg of 35% strength by weight hydrogen peroxide, dissolved in 10 l of demineralized water are added, and, after the autoclave is sealed, the batch is kept at 80° C. for 4 hours with stirring.

The batch is subsequently cooled and, after releasing the pressure, diluted to about 25% by weight using demineralized water.

Analytical data for the product thus prepared:
Solids—24.8% by weight
pH—6.7
Viscosity (20° C.)—4,800 mPa.s (Höppler)—
$\eta_{rel.}$*—1.48
Colour—pale yellow, opaque

*For the measurement of the relative viscosity ($\eta_{rel.}$), 1 g of dry hydrolysate is dissolved in 100 ml of 2 molar aqueous $NaNO_3$ solution.

EXAMPLE 2

2.1 Polymerization 48 kg of demineralized water
0.12 kg of 20% strength by weight aqueous Mersolat ® (alkanesulphonate)
0.12 kg of 2N $H_2SO_4$
1.320 kg of acrylonitrile
0.84 kg of styrene and
0.24 kg of methyl acrylate
are mixed together in an autoclave equipped with stirrer and, after the autoclave is sealed, heated to 40° C. under nitrogen.

When this temperature is reached, 1.324 kg of a solution of 0.324 kg of 35% strength by weight $H_2O_2$ and 1 kg of demineralized water, and 1.108 kg of a solution of 0.108 kg of isoascorbic acid and 1 kg of demineralized water as redox initiator are added to the autoclave contents via a pressure device. Then
1. A monomer mixture, comprising
   25.08 kg of acrylonitrile
   15.96 kg of styrene and
   4.56 kg of methylacrylate,
2. an initiator solution, comprising
   1.08 kg of hydrogen peroxide, 35% strength by weight, and
   10.8 kg of demineralized water, and
3. an emulsifier solution, comprising
   8.40 kg of demineralized water
   2.28 kg of 20% strength aqueous by weight Mersolat ® solution (alkanesulphonate) and
   0.36 kg of isoascorbic acid
are sluiced in simultaneously and continuously within 300 minutes.

When the sluiced addition is complete, the autoclave contents are stirred for a further 360 minutes at 40° C., and then cooled to room temperature.

A 39.5% strength by weight dispersion having an intrinsic viscosity (measured in DMF with 0.3% of $NaNO_3$) $[\eta]=1.05$ dl/g was obtained.

2.2 Hydrolysis

The product according to 2.1 is hydrolysed corresponding to Example 1, with the difference that the subsequent degradation using $H_2O_2$ is not carried out and, after the hydrolysis and removal of $NH_3$, the product is immediately diluted to about 25% by weight using demineralized water.

Analytical data of the product thus prepared:
Solids—25.4% by weight
pH—6.9
Viscosity (20° C.) (Höppler)—14,200 mPa.s
$\eta_{rel.}$*—1.95
Colour yellow-brown, opaque

*For the measurement of the relative viscosity ($\eta_{rel.}$), 1 g of dry hydrolysate is dissolved in 100 ml of 2 molar aqueous $NaNO_3$ solution.

No residual monomers could be detected by gas chromatography.

EXAMPLE 3

3.1 Polymerization

The polymer is prepared analogously to Example 2, with the following recipe modification:
Autoclave charge:
40.0 kg of demineralized water 0.1 kg of 20% strength by weight aqueous Mersolat ®
  (alkanesulphonate)
0.1 kg of 2N H$_2$SO$_4$
1.3 kg of acrylonitrile and
0.7 kg of styrene
  Addition of initiator at 40° C.:
1.18 kg of a solution of 0.18 kg of 35% strength by weight H$_2$O$_2$ and 1 kg of demineralized water, and
1.06 kg of a solution of 0.06 kg of isoascorbic acid and 1 kg of demineralized water
  Sluiced addition 1:
26.0 kg of acrylonitrile and
14.0 kg of styrene
  Sluiced addition 2:
9.0 kg of demineralized water and
0.6 kg of H$_2$O$_2$, 35% strength by weight
  Sluiced addition 3:
7.0 kg of demineralized water
1.9 kg of 20% strength by weight aqueous Mersosat ® solution (alkanesulphonate) and
0.2 kg of isoascorbic acid A 39.8% strength dispersion having an intrinsic viscosity index (measured in DMF with 0.3% of NaNO$_3$ [$\eta$] of 1.20 gl/g was obtained.

3.2 Hydrolysis 70 kg of the 39.8% strength by weight dispersion of the copolymer according to 3.1 are placed in a stirred autoclave together with 16.23 kg of KOH (88–90% by weight) and 58.8 kg of demineralized water, and, after the autoclave is sealed, heated to 175° C. under nitrogen. The reaction is ended after 5 hours at 175° C., and an approximately 25% strength by weight product is obtained corresponding to Example 2 (hydrolysis).

Analytical data of this product:
Solids—25% by weight
pH—7.4
Viscosity (20° C.) (Höppler)—4,000 mPa.s
$\eta_{rel.}$*—2.23
*For the measurement of the relative viscosity ($\eta_{rel.}$), 1 g of dry hydrolysate is dissolved in 100 ml of 2 molar aqueous NaNO$_3$ solution.

No residual monomers could be detected by gas chromatography.

APPLICATION EXAMPLES

Example A

In a separate size boiler, the size batch of:
300 l of water
30 kg of the product according to Example 2 and
30 kg of water-soluble starch
is prepared at 90° C. for 20 minutes with stirring, and transferred to the size trough, where a constant level and a temperature of 90° C. is maintained.

Cotton warp threads of strength 50 Nm are fed with a thread density of 22 threads/cm through the size trough over rollers.

After leaving the size trough, excess sizing agent is squeezed off from the thread assemblage by a pair of squeeze rollers, and, for drying, is subsequently fed over heated rollers at a temperature of 140° C. The warp threads are separated before winding up (called beaming).

The final moisture content of the sized thread was 8.5%.

The sized cotton warp threads could be processed without problems on commercially available weaving machines.

Example B, C and D:

A procedure was carried out as described in Example A. The corresponding data are collated in Table 1.

|  | Use Example | | | |
|---|---|---|---|---|
|  | A | B | C | D |
| Type of yarn | Cotton | viscose staple fibre | Cotton | Cotton/Polyester 50 50 |
| Thread strength | 50 Nm | 50 Nm | 24 Nm | 64 Nm |
| Thread density | 22 threads/cm | 26 threads/cm | 18 threads/cm | 25 threads/cm |
| Size batch |  |  |  |  |
| Water | 300 l | 400 l | 100 l | 320 l |
| Starch | 30 kg | — | — | 50 kg |
| CMC | — | 14 kg | — | 5 kg |
| Polymer | 30 kg according to Example 2 | 10 kg according to Example 2 | 100 kg according to Example 1 | 50 kg according to Example 3 |
| Size trough temperature | 90° C. | 85° C. | 80° C. | 85° C. |
| Drying temperature | 140° C. | 145° C. | 140° C. | 140° C. |
| Machine speed | 72 m/min | 80 m/min | 68 m/min | 50 m/min |
| Final moisture content | 8.5% | 9% | 6% | 5% |

We claim:
1. A process for the preparation of an aqueous solution of a hydrolyzed styrene/acrylonitrile copolymer, the carboxyl groups of which are entirely or partly present as NH$_4$ salt, an alkali metal salt or mixtures thereof, comprising subjecting
  (a) 50–70% by weight of acrylonitrile,
  (b) 30–50% by weight of styrene and
  (c) 0–20% by weight of at least one further monomer, which is capable of being hydrolyzed by alkali, to suspension or emulsion polymerization, and subsequently hydrolyzing the resultant aqueous dispersion or emulsion at 90°–220° C. in the presence of an alkali metal hydroxide, an alkaline earth metal hydroxide or mixtures thereof.
2. A process according to claim 1, wherein only acrylonitrile and styrene are copolymerized.
3. A process according to claim 1, wherein there is 3 to 15% by weight of the at least one further monomer which is capable of being hydrolyzed by alkali.
4. A process according to claim 1, which further comprises treating the copolymers with hydrogen peroxide, wherein a part of the styrene is replaced by a further monomer which cannot be hydrolyzed by alkali, wherein the further monomer which is capable of being hydrolyzed is selected from the group consisting of an acrylate having up to 5 C atoms in the alcohol compo- nent, a methacrylate having up to 5 C atoms in the alcohol component, vinyl acetate and unsaturated carboxylic acid.

5. A process according to claim 4, wherein the hydrogen peroxide is contained in an amount of 0.01 to 2% by weight relative to the weight of the copolymer.

6. A process according to claim 4, wherein the treatment with hydrogen peroxide is conducted at 20° to 100° C.

7. A process according to claim 4, wherein the unsaturated carboxylic acid is selected from the group consisting of maleic acid, methacrylic acid and itaconic acid.

8. A process according to claim 1, wherein the hydrolyzation is conducted at 120° to 190° C.

9. A process according to claim 1, wherein the alkali metal hydroxide is selected from the group consisting of NaOH and KOH.

10. A process according to claim 1, wherein the alkaline earth metal hydroxide is MgOH.

* * * * *

UNITED STATES PATENT AND TRADEMARK OFFICE
CERTIFICATE OF CORRECTION

PATENT NO. : 4,833,199

DATED : May 23, 1989

INVENTOR(S) : Hoppe et al.

It is certified that error appears in the above-identified patent and that said Letters Patent is hereby corrected as shown below:

Title Page     ABSTRACT :

line 7 before " 0-20% " insert -- (c) --

Signed and Sealed this

Third Day of December, 1991

*Attest:*

HARRY F. MANBECK, JR.

*Attesting Officer*      *Commissioner of Patents and Trademarks*